March 3, 1959   N. F. DIEDERICH   2,876,405
PROTECTIVE CIRCUIT FOR SYNCHRONOUS MOTORS
Filed Dec. 19, 1955
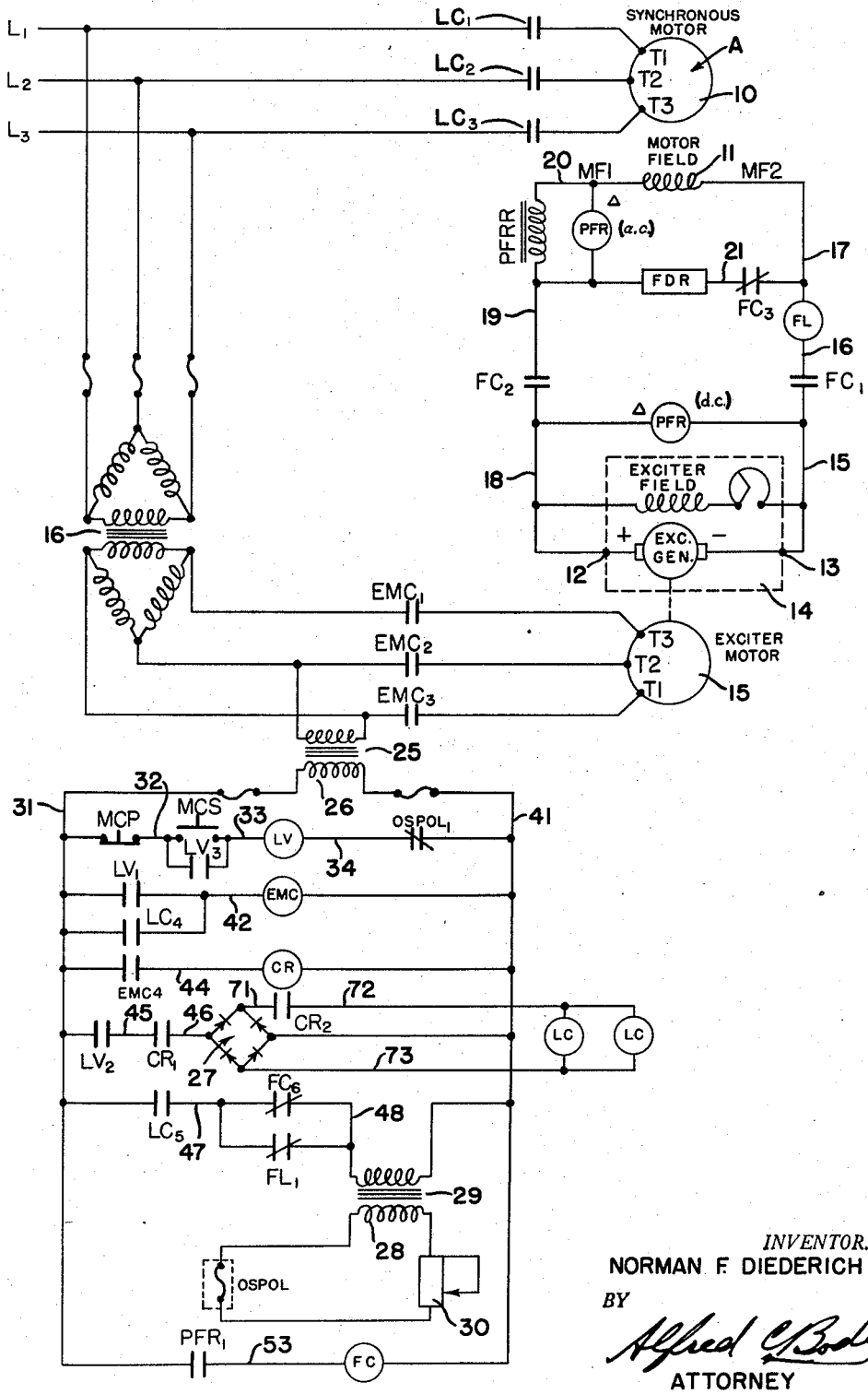
INVENTOR.
NORMAN F. DIEDERICH
BY
Alfred C. Body
ATTORNEY United States Patent Office 2,876,405
Patented Mar. 3, 1959

2,876,405

PROTECTIVE CIRCUIT FOR SYNCHRONOUS MOTORS

Norman F. Diederich, Cleveland, Ohio, assignor to The Electric Products Company, Cleveland, Ohio, a corporation of Ohio Application December 19, 1955, Serial No. 553,891

1 Claim. (Cl. 318—170)

This invention pertains to the art of synchronous motor starters and more particularly to improved apparatus and circuit for protecting such motors upon failure of the field coils to be properly energized.

In the art of synchronous motors, it is imperative that the field coil of the motor be energized only when the motor is operating at or near its synchronous speed. Thus, before the field coil can be energized in the course of starting such motors, assurance must be provided that the motor is at the proper speed. Similarly, once the motor is operating at synchronous speed and the field coil should, for some reason or other, become de-energized and the motor slow down below the synchronous speed, then provision must be made for preventing re-energization of the field coil until the motor has again been brought back to its synchronous speed. Further, provision must be made for limiting the length of time that the stator windings can be energized when the field coil is de-energized.

Heretofore, in the art of the starters for synchronous motors, it has been conventional to provide a field loss relay in series with the motor field coil, having a normally open contact so arranged that when open, neither the field nor the stator can be energized. Thus, with the motor running, if the field coil energization fails, the field loss relay contact immediately opens to de-energize both the stator and field.

With such an arrangement, it is necessary to provide a by-pass or shunt for the field loss relay contact, so that the motor can be initially started. Thus, normally, a timing relay is provided with a contact in shunt with the field loss relay contact and operable upon initial energization of the stator to shunt out the field loss relay contact for a predetermined period of time, sufficient to allow the motor under normal conditions to come up to synchronous speed. Then the field can be energized by the starter and the field loss relay contact closed, so that upon opening of the timing relay contact, the motor continues to run.

This arrangement has the disadvantage of both a high cost timing relay and further, any instantaneous interruption of the field coil energization immediately opens the field loss relay contact to de-energize the motor. As will appear, it has been found that there is no reason to de-energize the motor simply because of a momentary loss of field coil energization of insufficient time duration to allow the motor speed to fall below an amount such that if the field coil were again re-energized, the motor would again come back to synchronous speed without damage thereto.

A further difficulty with the present arrangement is that if the motor fails to come up to its synchronous speed within the predetermined time limit set by the time delay relay and the motor is de-energized and then if the operator resets the starter, the same time cycle would be repeated. However, the previous heating of the motor by the first unsuccessful start makes it possible to overheat the stator if it should again be re-energized for the same time period as determined by the time delay relay.

The present invention contemplates a circuit and arrangements of parts for a synchronous motor starter which overcomes all of the above difficulties and others, and provides a circuit which is simple, positive in operation, allows a momentary de-energization of the field coil without resulting in a permanent de-energiaztion of the motor and which has a memory with reference to previous de-energizations, or previous unsuccessful attempts to bring the motor into synchronism, so that time periods of field de-energization or of bringing the motor to synchronism will be successfully decreased as the motor itself becomes heated due to such undesirable operating conditions.

In accordance with the invention, there is provided a starter for synchronous motors having both a stator and a field coil, comprising in combination: stator energizing means, field coil energizing means, a delayed opening contact so arranged that upon opening, the field coil and stator coil will be de-energized and a field loss relay in series with the field coil having a normally closed contact in series with the actuating means of the delayed opening contact.

Further in accordance with the invention, the field coil energizing means has normally closed contacts in parallel with the field loss relay contacts, such that the delayed opening contact can also serve the function of disabling the starter in the event the motor does not come to synchronous speed in a predetermined time after initiating the starting cycle.

Still further in accordance with the invention, the delayed opening contact is of a type having a memory, that is to say, it integrates the length of time it is energized in relation to length of time it is un-energized, so that proportionately less and less time is required to effect its opening after a series of relatively short close-spaced energizations, each one being insufficient to effect the opening.

The principal object of the invention is a new and improved circuit arrangement for providing field failure protection on synchronous motor starters, which is simple, positive in operation, and requires a minimum number of inexpensive parts.

Another object of the invention is the provision of a new and improved field loss circuit for synchronous motor starters which does not shut the synchronous motor down upon losses of the field coil energization insufficient in time-length to damage the motor.

Another object of the invention is the provision of a new and improved arrangement for preventing the de-energization of a synchronous motor upon momentary losses of the field coil energization, which also functions on the starting of the synchronous motor.

Still another object of the invention is the provision of a new and improved protective arrangement for controlling the time periods that the stator may be energized prior to the energization of the field coil on starting, and for preventing de-energization of the stator upon momentary de-energization of the field coil which has a memory such that as the motor becomes heated due to repeated attempts to start it or repeated short losses of field energization while running, the time period in which the stator may be energized with no field energization is progressively decreased.

Still another object of the invention is the provision of a new and improved arrangement for protecting against the failure of the field coil of a synchronous motor to be properly energized, which includes a protective relay in series with the field coil having a normally closed contact arranged to control the energizing coil of a delayed opening contact which in turn controls the energization of the motor.

The invention may take physical form in a number of different appearing circuits, parts and combination of parts, a preferred embodiment of which will be described in detail in this specification and illustrated in the accompanying drawing which is part thereof and wherein:

The single figure is a schematic wiring diagram illustrating a preferred embodiment of the invention.

Referring now to the drawing the diagram shows schematically a synchronous motor A having a stator 10 and a field coil 11. The stator 10 is energized from terminals L1, L2, L3 of a multi-phase power source through the normally open contacts LC1, LC2, LC3 of a main line contactor LC.

The field coil 11 is excited from the terminals 12, 13 of a small auxiliary generator 14 driven by an exciter motor 15 energized from the terminals L1, L2, L3 through a three phase stepdown transformer 16 and contacts EMC1, EMC2 and EMC3 of an exciter main contactor EMC.

The terminal 13 of the exciter generator 14 connects to the motor field 11 through wire 15 normally open contact FC1, wire 16 the energizing coil of a field loss relay FL and wire 17.

The terminal 12 of the exciter generator connects to the other terminal of the motor field coil 11 through wire 18 normally open contact FC2 wire 19 the energizing coil of a phase synchronizing reactor PFRR and wire 20. The A. C. coil of a phase synchronizing relay PFR (A. C.) is connected between wires 19 and 20 and thus in shunt with the reactor PFRR.

A field discharge resistor FDR connects between the wires 19 and the wire 17 through wire 21 and normally closed contact FC3.

The D. C. coil of the phase synchronizing relay PFR (D. C.) is connected between wires 18 and 15.

The control circuit for the motor A is energized from a single phase transformer 25 connected to two of the leads of the multi-phase power source, and having a low voltage secondary 26 which may have any desired output voltage. 110 volts is preferred. The secondary 26 connects to wires 31 and 41 through fuses as shown.

The control circuit includes the energizing coil of the exciter main contactor EMC, which connects between the wire 41 and the wire 31 through either the normally open contacts LV1 or LC4 in parallel and the wire 42. The control circuit also includes the energizing coil of a control relay CR connected between the wires 31 and 41 through normally opened contacts EMC4 and wire 44.

A full wave rectifier 27 has its A. C. terminals connected between wire 41 and wire 31 through normally opened contacts LV2 wire 45 normally open contacts CR1 and wire 46. One terminal of the rectifier 27 connects to one terminal of the energizing coils of line contactors LC through wire 73. The other terminal of the rectifier 27 connects to the other terminal of the line contactors LC through wire 71, normally open contacts CR2 and wire 72.

Field coil contactor FC connects between the wires 41 and the wire 31 through the normally open contact PFR1 and wire 53.

The main control circuit is through the energizing coil of relay LV which is connected between the wires 31 and 41 through the normally closed contacts of a stop push button MCP wire 32 the normally open contacts of a start push button MCS in turn shunted by the normally open contacts LV3, which forms a holding circuit when the push button MCS is released, wire 33, the relay LV, wire 34, the normally closed contacts OSPOL1 to the wire 41.

The relay LV, as will appear, has contacts LV1 and LV2 which control the energization of the exciter main contactor EMC and the line contactor LC and thus the energization of the motor A.

The normally closed contact OSPOL1 is in series with relay LV and thus controls its energization and when this contact opens, the entire starter becomes de-energized.

The contact OSPOL1 is controlled through a circuit arrangement constructed particularly in accordance with the present invention. Thus, in the preferred embodiment, the contact OSPOL1 is of the delayed opening type, and preferably, the opening is controlled by a thermally heated device, indicated at OSPOL, which is energized from the secondary 28 of a transformer 29 through an adjustable resistor 30. The primary of transformer 29 is energized between the wires 31 and 41 through normally open contact LC5 wire 47 either normally closed paralleled contacts FC6 or FL1 to the wire 48.

The circuit just described has for the purposes of simplicity eliminated certain safety or interlock features normally included in starters of this type. Thus, door interlock switches, temperature switches, over-load switches and the like have been omitted. Obviously, they can be included, if desired.

In operation it may be assumed that the wires L1, L2, L3 are energized and thus the wires 31 and 41 are energized. To start the motor A the start switch MCS is closed, completing a circuit to energize the relay LV through the normally closed contacts OSPOL1. Energizing of the relay LV closes its normally open contacts LV1, LV2, LV3. Closing of LV3 forms a holding circuit around the start switch MCS and this switch may now be released without effect.

Closing of LV1 energizes the exciter motor contactor EMC, the contacts EMC1–4 of which close to energize the exciter motor 15 and the control relay CR. Energizing of the control relay CR closes its normally open contacts CR1, CR2 to energize the rectifier 27 and control LC through the now closed contact LV2 and contact CR2. This energizes the main line contactor LC which closes its contact LC1–5 to energize the stator 10 of the synchronous motor. Contact LC4 is in shunt with the already closed contact LV1 and nothing happens here. Contact LC5 energizes the primary of the transformer 29, through either or both of the contacts FC6 or FL1. Energizing of the transformer 29 energizes the heater of the device OSPOL, but nothing happens because of the delayed opening operation above described.

Adjustment of the resistor 30 controls the length of time that the contact OSPOL1 will remain closed. This time delay is preferably less than the time period in which the stator 10 may be electrically energized without having the field coil 11 energized without damage to the stator windings 10.

As the rotor of the motor A comes up to speed within the delayed opening time period of the contact OSPOL1, the effect is for a voltage to be generated in the motor field coil 11 of a frequency proportional to the rotating speed of the rotor. This voltage flows in a closed circuit which includes the motor field coil, the wire 20, the reactor PFRR, the field discharge resistor FDR, the wire 21, the closed contact FC3, and the wire 17. As the frequency decreases as the speed of the rotor increases, the relay PFR (A. C.) becomes energized to close the normally open contacts PFR1. It should be here noted that if the rotor does not come up to speed within the time period determined by the device OSPOL, the contact OSPOL1 will open to de-energize the contactors EMC and LC.

Assuming, however, that the contact PFR1 closes prior to the opening of the contact OSPOL1, the field contactor FC is energized to close the contacts FC1, FC2 and open the contacts FC3, FC6. The field coil 11 is thus energized from the exciter generator 14. At the same time the field discharge resistor is removed from the circuit by opening of the contact FC3.

Energizing of the field loss relay FL opens its normally closed contact FL1 and as the contact FC6 is also open, the transformer 29 is de-energized. Thus, continued heating of the heating element of the device OSPOL ceases. However, it should be noted, that this heating element has been heated an amount proportional to the length of time that the stator 10 was energized before the field coil 11 became energized. If the motor A should be stopped intentionally by the operator, and then restarted, the device OSPOL will remember that the stator 10 has had a substantial heating from the previous starting operation and will react this second time in a shorter time interval.

Obviously, when the contact OSPOL1 does open, the relay LV is de-energized to break the holding circuit around the start switch MCS and thus de-energize the contactors EMC and LC.

However, if it be assumed that everything is in order, and the field coil 11 becomes energized in the normal manner, the heated element of the device OSPOL will cool to the normal room temperature. The motor A is heated to its normal running temperature. If the motor A should be stopped and then immediately restarted, it will be appreciated that it is at a normal running temperature, and the time required for contacts OSPOL1 to operate should be so adjusted by the resistor 30 so as to open in a time interval less than that required for the startor 10 to be heated from its normal running temperature to a dangerous damaging temperature. Normally, synchronous motors are so arranged with their load that the load is not placed on the motor until the field coil 11 is energized. Control apparatus to place the load on the synchronous motor after it is started may be provided if desired.

Assuming the motor A is under load and the field coil 11 should become de-energized, the result will be that the stator currents will rise to damaging values and the motor will also commence to slow down. Heretofore, it has been the practice that if the motor field 11 should become de-energized momentarily, to immediately de-energize the stator and bring the motor to a stop. The present invention, however, contemplates an arrangement whereby temporary interruptions in the motor field energization will not stop the motor until the motor has either dropped to a speed dangerously below its synchronous speed, or until the high currents in the stator have flowed for a time which would create a dangerous damaging condition.

Thus if the field coil becomes de-energized, the field loss relay having a normally closed contact FL1, closes this contact to energize the transformer 29 and thus commence the heating action on the out of synchronism protective overload device OSPOL. Nothing happens at this point, however, due to the delayed opening action of the contact OSPOL1. Should the field energization again be restored, the field loss relay FL will become re-energized, opening its contact FL1, and de-energizing the transformer 29. The heating action of device OSPOL thus stops. The motor continues to run as before.

Should the field again immediately lose its excitation, the same action occurs, but as the heater element due to its stored heat is able to remember that a short moment before the field coil was de-energized, a lesser amount of time will be required to open the contact OSPOL1.

In any event, whenever the field remains de-energized, a sufficient lentgh of time to open the contact OSPOL1, the relay LV is de-energized to break the holding circuit about the start button MCS and the contactors LC and EMC are immediately opened to de-energize the motor A.

If the difficulty with field excitation should be immediately remedied and the operator again attempts to start the motor A, the heater element is still warm along with the stator 10 and the time required to open the contact OSPOL1 on such starting will be less in a proportional amount to the then temperature of the stator coils.

The invention has been described with reference to one particular type of frequency sensitive device for controlling the energization of the field 11 as the motor A comes up to speed. Obviously, any other known device could be provided here.

The device for actuating contact OSPOL1 can be of any known or desired type, which will give a desired and controllable time delay. Thus, if desired, a conventional time delay opening contact such as one controlled by a dash pot, or the like, could be employed. Such device, while preventing de-energization of the motor A upon instantaneous field coil energization failures, would not have the memory effect of a thermally actuated contact such as the preferred embodiment contemplates. Such thermally actuated device may be of any known type, for example, of the lead pot type, wherein a heater element heats lead which in the solidified state holds the contact closed, but after having been heated for a predetermined period of time, and having reached a predetermined temperature, melts to allow the contact to open.

It will be appreciated that an embodiment of the invention has been described which accomplishes all of the objectives heretofore set forth, and others, and provides an improved starter for synchronous motors, which will not cause de-energization of the motor upon momentary de-energization of the field coil, but which is sensitive to closely repeated periods of field coil de-energizations so as to integrate such periods and make the time period required less and less as the stator becomes heated due to such field coil de-energizations.

It will be appreciated that modifications and alterations of the embodiment of the invention described will occur to others upon a reading and understanding of this specification, and it is my intention to include all such modifications and alterations insofar as they come within the scope of the present invention.

Having thus described my invention, I claim:

In a synchronous motor starter, said synchronous motor including a field coil and a stator coil, said starter including a stator contactor having an energizing coil and normally open contacts in series with said stator coil, a field coil energizing contactor including normally open contacts in series with said field coil and a normally closed contact, a field loss relay including an energizing coil in series with said field coil, and a normally closed contact, a thermally actuated relay having an energizing coil and a normally closed contact in series with said main line contactor energizing coil, said field coil energizing contactor normally closed contact, and said field loss relay normally closed contact being in electrical parallel relationship, and said parallel contacts being in series with said thermally actuated relay energizing coil, whereby said thermally actuated relay is operative to de-energize said stator contactor after closely repeated periods of field coil de-energization integrated in relation to time sufficient to damage said stator coil.

References Cited in the file of this patent
UNITED STATES PATENTS

| | | |
|---|---|---|
| 2,299,771 | Stivender | Oct. 27, 1942 |
| 2,323,485 | Pell | July 6, 1943 |
| 2,408,226 | Pringle | Sept. 24, 1946 |
| 2,478,693 | Herziger | Aug. 9, 1949 |